United States Patent
Kang et al.

(10) Patent No.: US 10,658,088 B2
(45) Date of Patent: May 19, 2020

(54) COLLIMATOR AND INSPECTION SYSTEM HAVING THE SAME

(71) Applicants: Tsinghua University, Beijing (CN); NUCTECH COMPANY LIMITED, Beijing (CN)

(72) Inventors: Kejun Kang, Beijing (CN); Ying Li, Beijing (CN); Jianmin Li, Beijing (CN); Yulan Li, Beijing (CN); Guoping Zhu, Beijing (CN)

(73) Assignees: TSINGHUA UNIVERSITY, Beijing (CN); NUCTECH COMPANY LIMITED, Beijing (CN)

( * ) Notice: Subject to any disclaimer, the term of this patent is extended or adjusted under 35 U.S.C. 154(b) by 211 days.

(21) Appl. No.: 15/277,828

(22) Filed: Sep. 27, 2016

(65) Prior Publication Data
US 2017/0186507 A1 Jun. 29, 2017

(30) Foreign Application Priority Data
Dec. 28, 2015 (CN) .......................... 2015 1 1001491

(51) Int. Cl.
*G21K 1/04* (2006.01)
*G01V 5/00* (2006.01)

(52) U.S. Cl.
CPC ............ *G21K 1/043* (2013.01); *G01V 5/0016* (2013.01); *G21K 1/04* (2013.01)

(58) Field of Classification Search
CPC ............................ G21K 1/043; G01V 5/0016
USPC ............................................ 378/57, 145–153
See application file for complete search history.

(56) References Cited

U.S. PATENT DOCUMENTS

| 2,570,820 A | 10/1951 | Knab |
| 3,151,245 A | 9/1964 | Wilson |
| 3,829,701 A * | 8/1974 | Hura ...................... G03B 42/02 378/153 |
| 4,534,052 A | 8/1985 | Milcamps |
| 5,165,106 A * | 11/1992 | Barthelmes ............ G21K 1/046 250/505.1 |

(Continued)

FOREIGN PATENT DOCUMENTS

| CN | 1685447 A | 10/2005 |
| CN | 101632135 A | 1/2010 |

(Continued)

OTHER PUBLICATIONS

European Patent Application No. 16191080.7; Extended Search Report; dated Oct. 16, 2017; 11 pages.

(Continued)

*Primary Examiner* — Courtney D Thomas
(74) *Attorney, Agent, or Firm* — BakerHostetler

(57) ABSTRACT

A collimator and an inspection system having the collimator are disclosed. The collimator includes: a collimator body including a first part and a second part; a collimating slit formed between the first part and the second part and having a first end and a second end in a longitudinal direction thereof; and a shielding member which is movable relative to the collimator body such that both a beam divergent angle and an elevation angle of a ray beam propagating through the collimating slit are varied. An inspection system and an inspection method for scanning a vehicle are further disclosed.

17 Claims, 12 Drawing Sheets

(56) References Cited

U.S. PATENT DOCUMENTS

| | | | | |
|---|---|---|---|---|
| 5,493,596 | A | * | 2/1996 | Annis .................... G01N 23/10 378/146 |
| 5,666,393 | A | * | 9/1997 | Annis .................... G01N 23/04 378/57 |
| 5,748,703 | A | * | 5/1998 | Cosman ............... A61N 5/1042 378/147 |
| 2005/0243422 | A1 | | 11/2005 | Distler et al. |
| 2008/0298546 | A1 | | 12/2008 | Bueno et al. |
| 2010/0111261 | A1 | | 5/2010 | Maack |
| 2010/0119033 | A1 | * | 5/2010 | Li ........................... A61B 6/06 378/5 |
| 2011/0261929 | A1 | * | 10/2011 | McNabb, Jr. ........ G01V 5/0016 378/62 |
| 2017/0186507 | A1 | | 6/2017 | Kang et al. |

FOREIGN PATENT DOCUMENTS

| | | |
|---|---|---|
| CN | 202013328 U | 10/2011 |
| CN | 102824186 A | 12/2012 |
| CN | 104464871 A | 3/2015 |
| CN | 105403580 A | 3/2016 |
| CN | 205263000 U | 5/2016 |
| EP | 3041002 A1 | 7/2016 |
| JP | H11-248650 A | 9/1999 |
| JP | 2012-007935 A | 1/2012 |
| RU | 2393633 C1 | 6/2010 |
| WO | WO 2009/137698 A1 | 11/2009 |

OTHER PUBLICATIONS

European Patent Application No. 16191080.7; Partial Search Report; dated May 22, 2017; 10 pages.

Eurasian Patent Application No. 201792410/31; Office Action; dated Mar. 21, 2019; 2 pages.

Singapore Patent Application No. 11201709938U; Written Opinion; dated Jun. 24, 2019; 4 pages.

European Patent Application No. 16191080.7; Office Action 94(3); dated Aug. 27, 2019; 5 pages.

* cited by examiner

COLLIMATOR AND INSPECTION SYSTEM HAVING THE SAME

CROSS-REFERENCE TO RELATED APPLICATION

This application claims the benefit of Chinese Patent Application No. 201511001491.2 filed on Dec. 28, 2015 in the State Intellectual Property Office of China, the whole disclosure of which is incorporated herein by reference.

BACKGROUND OF THE INVENTION

Field of the Invention

Embodiments of the present disclosure relate to an adjustable collimator and an inspection system, in particular, to an inspection system and an inspection method for scanning a vehicle.

Description of the Related Art

An inspection system typically uses a ray such as X-ray or the like to inspect an object to be inspected. During such an inspection system is used, it is generally required to ensure an image quality while controlling or supervising exterior radiation, i.e. boundary dose rate.

In an existing inspection system, the image quality is improved by increasing the dose rate in a case that a radiation protection device and an area of a radiation controlled area are kept unchanged, in such case, the boundary dose rate is inevitably increased. Alternatively, the image quality has to be sacrificed in order to control the boundary dose rate. Thus, there is a contradiction between increasing the image quality and controlling the boundary dose rate. The existing inspection system is not capable of addressing this contradiction well.

Therefore, it is required to improve the existing inspection system, in order to ensure the image quality while being adapted to a case in which the boundary dose rate should be kept low.

SUMMARY OF THE INVENTION

In order to meet the above requirements, the present disclosure provides an adjustable collimator and an inspection system having the same. Further, the present disclosure provides an inspection system for scanning a vehicle and an inspection method using the inspection system.

According to an aspect of the present disclosure, it is provided a collimator comprising:

a collimator body comprising a first part, a second part, and a collimating slit formed between the first part and the second part, the collimating slit having a first end and a second end in a longitudinal direction thereof, and a shielding member which is movable relative to the collimator body such that a beam divergent angle of a ray beam propagating through the collimating slit is varied or both a beam divergent angle and an elevation angle of a ray beam propagating through the collimating slit are varied.

In an embodiment, the shielding member is movable relative to the collimator body to completely shield the ray beam propagating through the collimating slit.

In an embodiment, the shielding member is configured to shield at least a part of the collimating slit as it moves relative to the collimator body, so as to allow the ray propagating through a remaining part of the collimating slit to form a continuous ray beam, the beam divergent angle of the continuous ray beam or both the beam divergent angle and the elevation angle of the continuous ray beam being varied as the shielding member moves relative to the collimator body.

In an embodiment, the shielding member is capable of adjusting steplessly the beam divergent angle of the ray beam propagating through the collimating slit or both the beam divergent angle and the elevation angle of the ray beam propagating through the collimating slit as the shielding member moves relative to the collimator body.

In an embodiment, the shielding member comprises a first shielding part which is disposed adjacent to the first end of the collimating slit and is movable in the longitudinal direction of the collimating slit relative to the collimator body; and/or a second shielding part which is disposed adjacent to the second end of the collimating slit and is movable in the longitudinal direction of the collimating slit relative to the collimator body.

In an embodiment, the shielding member comprises a first shielding part which is disposed at a side of the first part of the collimator body and is movable in a direction perpendicular to the longitudinal direction of the collimating slit in a plane passing through the collimating slit and perpendicular to a beam profile relative to the collimator body; and/or a second shielding part which is disposed at a side of the second part of the collimator body and is movable in a direction perpendicular to the longitudinal direction of the collimating slit in a plane passing through the collimating slit and perpendicular to the beam profile relative to the collimator body.

In an embodiment, the first shielding part and/or the second shielding part each has a cross section of multi-stepped shape or triangular shape.

In an embodiment, the shielding member comprises a first shielding part and a first pivot which both are disposed adjacent to the first end of the collimating slit, the first pivot extending in a direction perpendicular to the longitudinal direction of the collimating slit in a plane parallel to a beam profile, the first shielding part being pivotable about the first pivot relative to the collimator body; and/or a second shielding part and a second pivot which both are disposed adjacent to the second end of the collimating slit, the second pivot extending in the direction perpendicular to the longitudinal direction of the collimating slit in the plane parallel to the beam profile, the second shielding part being pivotable about the second pivot relative to the collimator body.

In an embodiment, the first shielding part and/or the second shielding part each has a planar plate-like structure having a semi-circular cross section.

In an embodiment, the first shielding part and the second shielding part are spaced from the collimating slit by different distances in a ray propagating direction.

In an embodiment, the shielding member comprises a first shielding part and a first pivot which both are disposed adjacent to the first end of the collimating slit, an axis of the first pivot extending in a direction perpendicular to a beam profile, the first shielding part being pivotable about the first pivot relative to the collimator body; and/or a second shielding pan and a second pivot which both are disposed adjacent to the second end of the collimating slit, the second pivot extending in the direction perpendicular to the beam profile, the second shielding part being pivotable about the second pivot relative to the collimator body.

In an embodiment, the shielding member comprises a first shielding part which is disposed at a side of the first part of the collimator body and a first pivot which is disposed adjacent to the first end of the collimating slit, an axis of the first pivot extending in a direction parallel to the longitudinal direction of the collimating slit in a plane parallel to a beam profile, the first shielding part being pivotable about the first pivot relative to the collimator body to shield at least a part of the collimating slit; and/or a second shielding pan which is disposed at a side of the second part of the collimator body and a second pivot which is disposed adjacent to the second end of the collimating slit, an axis of the second pivot extending in the direction parallel to the longitudinal direction of the collimating slit in the plane parallel to the beam profile, the second shielding part being pivotable about the second pivot relative to the collimator body to shield at least a part of the collimating slit.

In an embodiment, the first shielding part and/or the second shielding part each is formed by cutting a quarter of an annular cylinder.

In an embodiment, the first shielding part and the second shielding part are allowed to move relative to the collimator body independently from each other.

In an embodiment, the first shielding part and the second shielding part are allowed to move relative to the collimator body in synchronization with each other.

According to another aspect of the present disclosure, it is provided an inspection system comprising:

a ray source for emitting ray;

the collimator according to claim 1 configured for collimating the ray emitted from the ray source;

a detector for receiving the ray; and a controller configured to be electrically connected to the collimator and control the shielding member to move relative to the collimator body.

According to another further aspect of the present disclosure, it is provided an inspection method for scanning a vehicle, comprising steps of:

selecting a scanning mode;

emitting ray by a ray source:

enabling the ray to propagate through a collimating slit of a collimator so as to form a ray beam;

measuring a boundary dose rate of a radiation supervised area; and controlling a shielding member of the collimator to move relative to a collimator body based on the selected scanning mode and the measured boundary dose rate.

In an embodiment, the scanning mode comprises a standard scanning mode in which the ray propagating through the collimating slit scans the whole vehicle and a secondary scanning mode in which the ray propagating through the collimating slit performs a secondary scan on a suspected area determined through the standard scanning.

In an embodiment, the step of controlling a shielding member of the collimator to move relative to a collimator body based on the selected scanning mode and the measured boundary dose rate comprises:

controlling the shielding member of the collimator to move relative to the collimator body so as to shield at least a part of the ray beam propagating through the collimating slit in the standard scanning mode.

In an embodiment, the step of controlling a shielding member of the collimator to move relative to a collimator body based on the selected scanning mode and the measured boundary dose rate comprises: controlling the shielding member of the collimator to move relative to the collimator body while increasing the dose rate and/or an energy of the ray source in the secondary scanning mode, so as to improve an image quality while keeping an area of the radiation supervised area and the boundary dose rate constant.

DETAILED DESCRIPTION OF PREFERRED EMBODIMENTS OF THE INVENTION

First of all, it is necessary to explain and define the following terms and expressions for ease of description and understanding.

A term "radiation controlled area" refers to an area divided from a radiation workplace, in which a specialized protection means and safety measure is required or possibly required in order to: (a) control a normal irradiation or prevent a dispersal of pollution in a normal working condition; and (b) prevent a potential irradiation or limit a degree thereof.

A term "radiation supervised area" refers to an area which is not determined as the radiation controlled area and in which a specialized protection means and safety measure is normally not required but it is required to supervise continuously the irradiation condition therein.

An expression "beam profile" refers to a cross section of a ray beam emitted from a collimating slit of a collimator along a propagating direction of the ray beam.

An expression "Y-plane" refers to a plane which is coincident with the beam profile.

An expression "Z-plane" refers to a plane which is perpendicular to the Y-plane and passes through the collimating slit.

An expression "X-plane" refers to a plane which is perpendicular to the Y-plane and the collimating slit.

Next, specific embodiments of the present disclosure will be explained with reference to the accompanying drawings.

Figure 1:
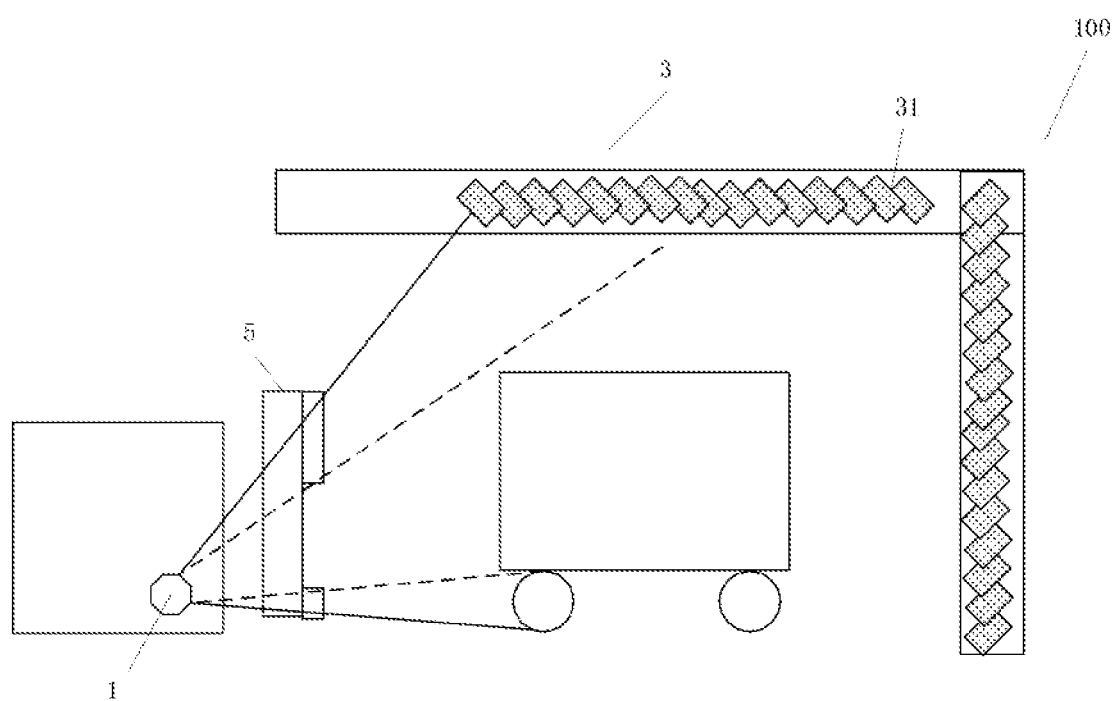
FIG. 1 is a schematic view showing that an inspection system according to an embodiment of the present disclosure is in a scanning state.

Referring to FIG. 1, an inspection system or a safety inspection system 100 according to an embodiment of the present disclosure comprises a ray source 1 for emitting ray; a collimator 5 for collimating the ray emitted from the ray source; and a detector 31 for receiving the ray. The ray source may comprise an X-ray source, a gamma ray source, a neutron ray source or the like. The detector 31 may be mounted on a detector arm 3 which may have a substantially inverted L-shape or any other suitable shapes.

First Embodiment

Figure 2A:
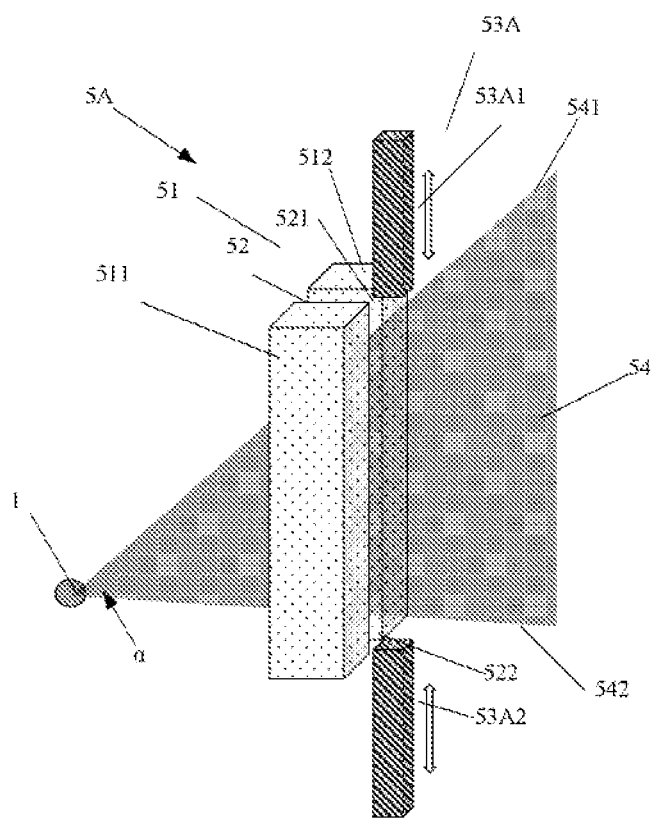
FIG. 2A is a schematic view of a collimator according to a first embodiment of the present disclosure, in which the collimator is in an initial position in which it does not shield a ray beam.
Figure 2B:
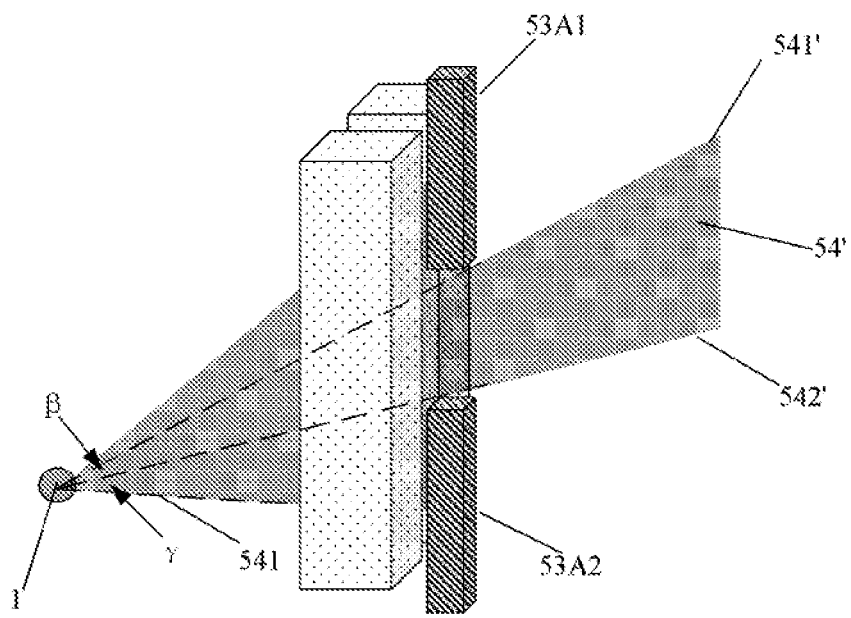
FIG. 2B is a schematic view of the collimator according to the first embodiment of the present disclosure, in which the collimator is in a moved position in which it shields a part of the ray beam.

FIGS. 2A-2B are schematic views of a collimator 5A according to a first embodiment of the present disclosure. As shown, the collimator 5A comprises: a collimator body 51 comprising a first part 511, a second part 512 and a collimating slit 52 which is formed between the first part 511 and the second part 512 and has a first end 521 and a second end 522 in a longitudinal direction thereof; and a shielding member 53A which is movable relative to the collimator body 51 to shield at least a part of the collimating slit 52 such that a beam divergent angle of a ray beam 54 propagating through the collimating slit 52 is varied or both a beam divergent angle and an elevation angle of a ray beam 54 propagating through the collimating slit 52 are varied.

Specifically, as shown in FIGS. 2A-2B, the shielding member 53A comprises a first shielding part 53A1 disposed adjacent to the first end 521 of the collimating slit 52 and a second shielding part 53A2 disposed adjacent to the second end 522 of the collimating slit 52. The first shielding part 53A1 and the second shielding part 53A2 are movable relative to the collimator body 51 in the longitudinal direction of the collimating slit, so as to shield at least a part of the collimating slit 52 FIG. 2A shows that the shielding member is in an initial position, as shown, the first shielding part 53A1 and the second shielding part 53A2 do not shield the collimating slit 52, so that the ray emitted from the ray source 1 propagates through the collimating slit 52 in a totally non-shielded manner so as to form a ray beam 54. FIG. 2B shows that the shielding member is in a moved position, as shown, the first shielding part 53A1 and the second shielding part 53A2 shield an upper portion and a lower portion of the collimating slit 52, respectively, so that the ray propagates through a remaining portion of the collimating slit 52 so as to form a continuous beam ray, and such a continuous beam ray is labeled as 54' in order to distinguish the two ray beams. As shown in FIG. 2A and FIG. 2B, abeam divergent angle formed between an upmost ray 541 and a lowest ray 542 of the ray beam 54 is labeled as a, and a beam divergent angle formed between an upmost ray 541' and a lowest ray 542' of the ray beam 54' is labeled as P. In other words, the beam divergent angle of the ray beam propagating through the collimating slit refers to the included angle between the upmost ray and the lowest ray of the ray beam propagating through the collimating slit. It can be seen that the beam divergent angle β is varied relative to the beam divergent angle α. Further, as shown, the beam divergent angle β can be correspondingly varied as the first shielding part 53A1 and the second shielding part 53A2 move relative to the collimator body 51. Meanwhile, an elevation angle (which refers to an included angle between the lowest ray of the ray beam propagating through the collimating slit and the horizontal direction) of the ray beam can be also varied correspondingly as the first shielding part 53A1 and the second shielding part 53A2 move relative to the collimator body 51. Herein, the expression that "the elevation angle is varied" is meant that there is an angle γ (as shown in FIG. 2B) between the lowest ray 542 of the ray beam before being adjusted and the lowest ray 542' of the adjusted ray beam. When the first shielding part 53A1 and the second shielding part 53A2 further move to shield the collimating slit 52 fully, the ray emitted from the ray source 1 is totally shielded. Thus, by controlling the first shielding part 53A1 and the second shielding part 53A2 to move relative to the collimator body 51, the beam divergent angle of the ray beam propagating through the collimating slit 52 can be controlled or both the beam divergent angle and the elevation angle of the ray beam propagating through the collimating slit 52 can be controlled, also, it can be controlled whether the ray propagates through the collimating slit 52.

It should be appreciated by those skilled in the art that a stepless adjustment of both the beam divergent angle and the elevation angle of the ray beam propagating through the collimating slit 52 can be realized when the first shielding part 53A1 and the second shielding part 53A2 move upward and downward relative to the collimator body 51. For example, if the beam divergent angle of the ray beam 54 in the initial position as shown in FIG. 2A is equal to 50°, the beam divergent angle of the ray beam 54 can be steplessly adjusted from 50° to 0° as the first shielding part 53A1 and the second shielding part 53A2 move upward and downward relative to the collimator body 51, thereby realizing a beam divergent angle of any values within a range of from 0° to 50°.

Second Embodiment

FIGS. 3A-3D are schematic views of a collimator 5B according to a second embodiment of the present disclosure. In this embodiment, the same or similar members as that in the first embodiment are labeled as the same or similar reference numerals. The second embodiment differs from the first embodiment mainly in the shielding member.

Figure 3A:
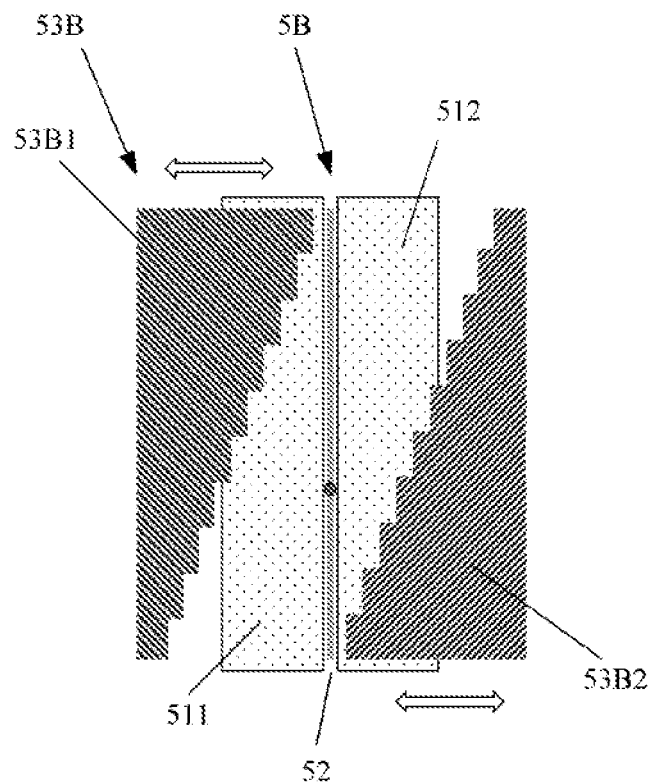
FIG. 3A is a schematic from view of a collimator according to a second embodiment of the present disclosure, in which the collimator is in an initial position in which it does not shield a ray beam.

The collimator 5B comprises a shielding member 53B. Specifically, as shown in FIG. 3A, the shielding member 53B comprises a first shielding part 53B1 disposed at a side of the first part 511 of the collimator body 51 and a second shielding part 53B2 disposed at a side of the second part 512 of the collimator body 51. As shown, the first shielding part 53B 1 and the second shielding part 53B2 each has a multi-stepped structure. In this way, the first shielding part 53B1 and the second shielding part 53B2 can shield at least a part of the collimating slit 52 as they move leftward and rightward in a direction perpendicular to the longitudinal direction of the collimating slit 52 in Z-plane relative to the collimator body S1.

Figure 3B:
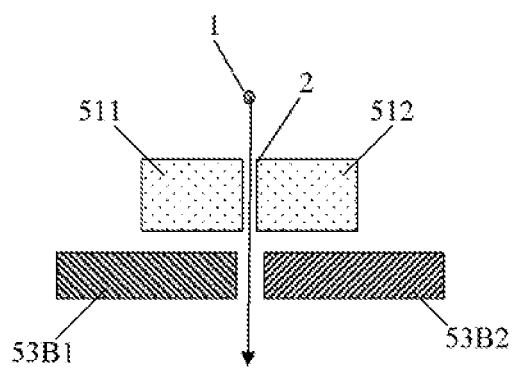
FIG. 3B is a schematic top view of the collimator according to the second embodiment of the present disclosure, in which the collimator is in an initial position in which it does not shield a ray beam.
Figure 3C:
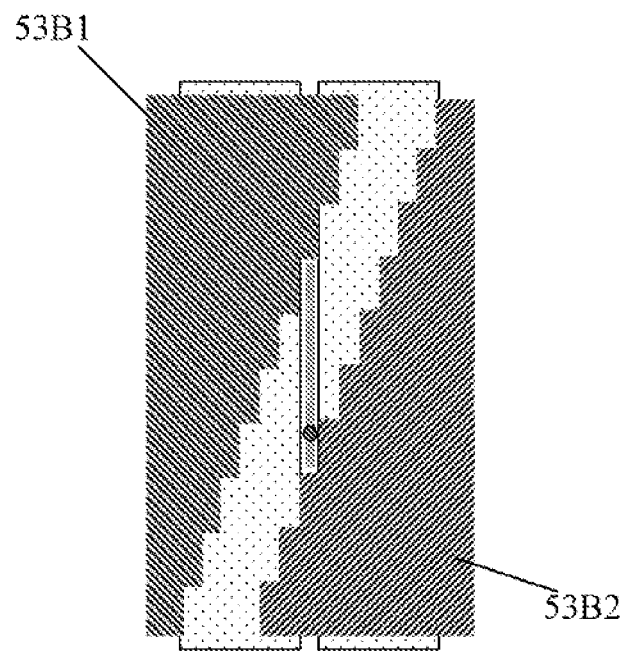
FIG. 3C is a schematic front view of the collimator according to the second embodiment of the present disclosure, in which the collimator is in a moved position in which it shields a part of the ray beam.
Figure 3D:
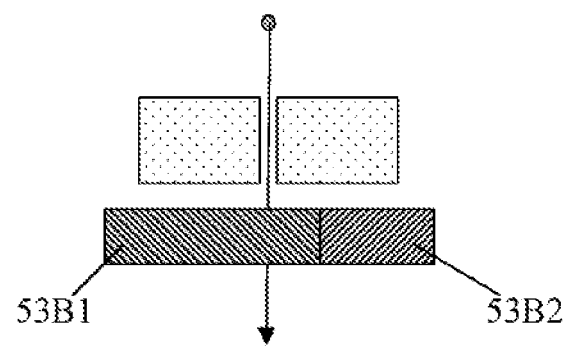
FIG. 3D is a schematic top view of the collimator according to the second embodiment of the present disclosure, in which the collimator is in a moved position in which it shields a part of the ray beam.
Figure 4A:
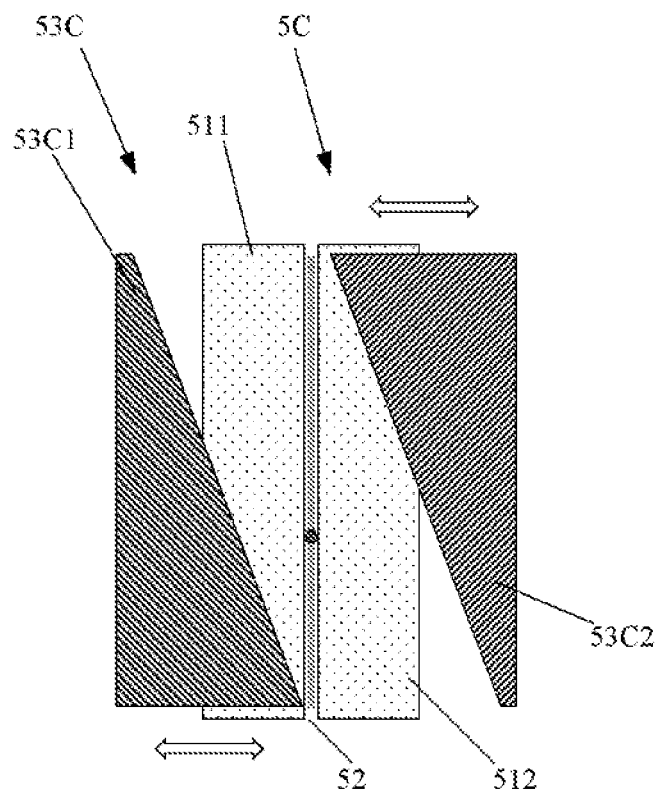
FIG. 4A is a schematic front view of a collimator according to a third embodiment of the present disclosure, in which the collimator is in an initial position in which it does not shield a ray beam.
Figure 4B:
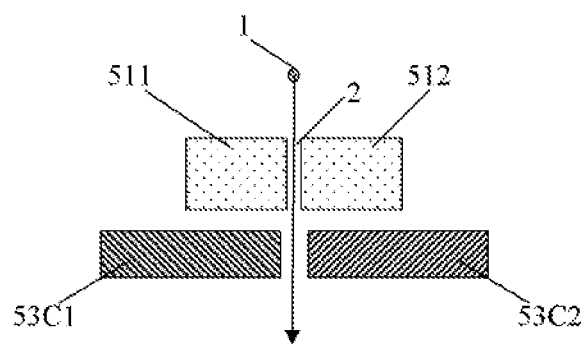
FIG. 4B is a schematic top view of the collimator according to the third embodiment of the present disclosure, in which the collimator is in an initial position in which it does not shield a ray beam.
Figure 4C:
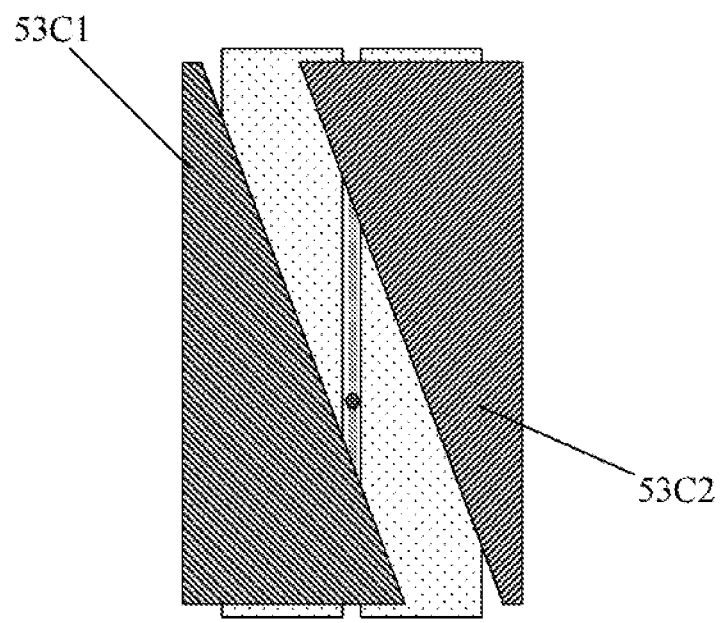
FIG. 4C is a schematic from view of the collimator according to the third embodiment of the present disclosure, in which the collimator is in a moved position in which it shields a part of the ray beam.
Figure 4D:
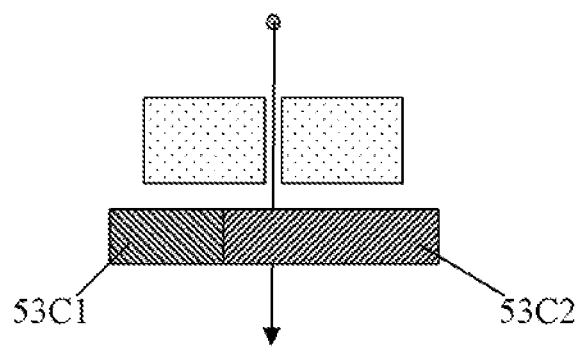
FIG. 4D is a schematic top view of the collimator according to the third embodiment of the present disclosure, in which the collimator is in a moved position in which it shields a part of the ray beam.

FIGS. 3A-3B show that the shielding member is in an initial position, as shown, the first shielding part 53B1 and the second shielding part 53B2 do not shield the collimating slit 52, so that the ray emitted from the ray source 1 propagates through the collimating slit 52 in a totally non-shielded manner. FIGS. 3C-3D show that the shielding member is in a moved position, as shown, the first shielding part 53B1 and the second shielding part 53B2 shield an upper portion and a lower portion of the collimating slit 52, respectively, so that the ray propagates through a remaining portion of the collimating slit 52 so as to form a continuous beam ray, and such a continuous beam ray is labeled as 54' in order to distinguish the two ray beams. Thus, it should be appreciated by those skilled in the art that, by controlling the first shielding part 53B 1 and the second shielding part 53B2 to move relative to the collimator body 51, both the beam divergent angle and the elevation angle of the ray beam propagating through the collimating slit 52 can be controlled, also, it can be controlled whether the ray propagates through the collimating slit 52.

Third Embodiment

FIGS. 4A-4D are schematic views of a collimator 5C according to a third embodiment of the present disclosure. In this embodiment, the same or similar members as that in the first and second embodiments are labeled as the same or similar reference numerals. The third embodiment differs from the second embodiment mainly in the shape of the shielding member. The collimator 5C comprises a shielding member 53C. As shown in FIGS. 4A-4D, the shielding member 53C comprises a first shielding part 53C1 disposed at a side of the first part 511 of the collimator body 51 and a second shielding part 53C2 disposed at a side of the second part 512 of the collimator body 51. As shown, differing from the multi-stepped shape in the second embodiment, the first shielding part 53C 1 and the second shielding part 53C2 each has a triangular-shaped cross section. In this way, the first shielding part 53C 1 and the second shielding part 53C2 can shield at least a part of the collimating slit 52 in a steplessly adjusting manner as they move leftward and rightward in a direction perpendicular to the longitudinal direction of the collimating slit 52 in Z-plane relative to the collimator body 51, thereby realizing a stepless adjustment of the ray beam propagating through the collimating slit 52.

Fourth Embodiment

FIGS. 5A-5D are schematic views of a collimator 5D according to a fourth embodiment of the present disclosure. In this embodiment, the same or similar members as that in the first, second and third embodiments are labeled as the same or similar reference numerals. The fourth embodiment differs from the above embodiments mainly in a structure and a movement manner of the shielding member.

Figure 5A:
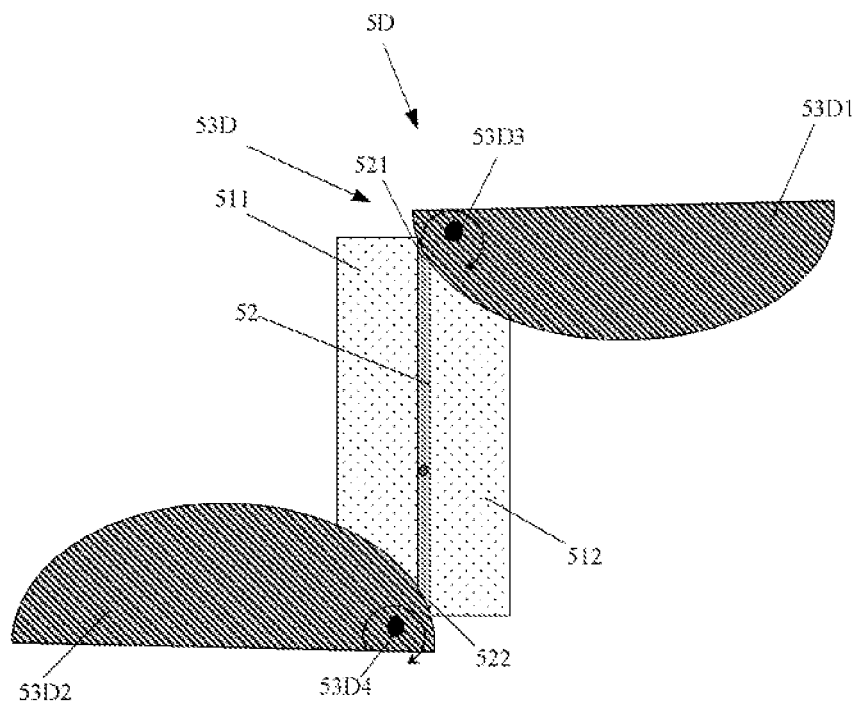
FIG. 5A is a schematic front view of a collimator according to a fourth embodiment of the present disclosure, in which the collimator is in an initial position in which it does not shield a ray beam.

The collimator 5D comprises a shielding member 53D. Specifically, as shown in FIG. 5A, the shielding member 53D comprises a first shielding part 53D1 disposed adjacent to the first end 521 of the collimating slit 52 and a second shielding part 53D2 disposed adjacent to the second end 522 of the collimating slit 52. As shown, the first shielding part 53D1 and the second shielding part 53D2 each has a planar plate-like structure having a semi-circular cross section. Further, the shielding member 53D comprises a first pivot 53D3 disposed adjacent to the first end 521 of the collimating slit 52 and a second pivot 53D4 disposed adjacent to the second end 522 of the collimating slit 52. Axes of the first pivot 53D3 and the second pivot 53D4 both extend in a direction parallel to the Y-plane and perpendicular to the longitudinal direction of the collimating slit 52. In this way, the first shielding part 53D1 is pivotable about the first pivot 53D3 relative to the collimator body 51 and the second shielding part 53D2 is pivotable about the second pivot 53D4 relative to the collimator body 51.

Figure 5B:
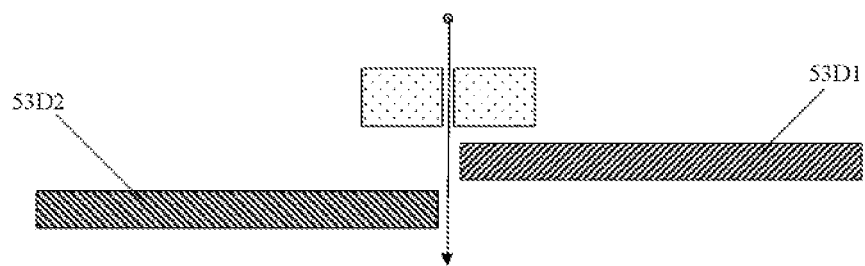
FIG. 5B is a schematic top view of the collimator according to the fourth embodiment of the present disclosure, in which the collimator is in an initial position in which it does not shield a ray beam.
Figure 5C:
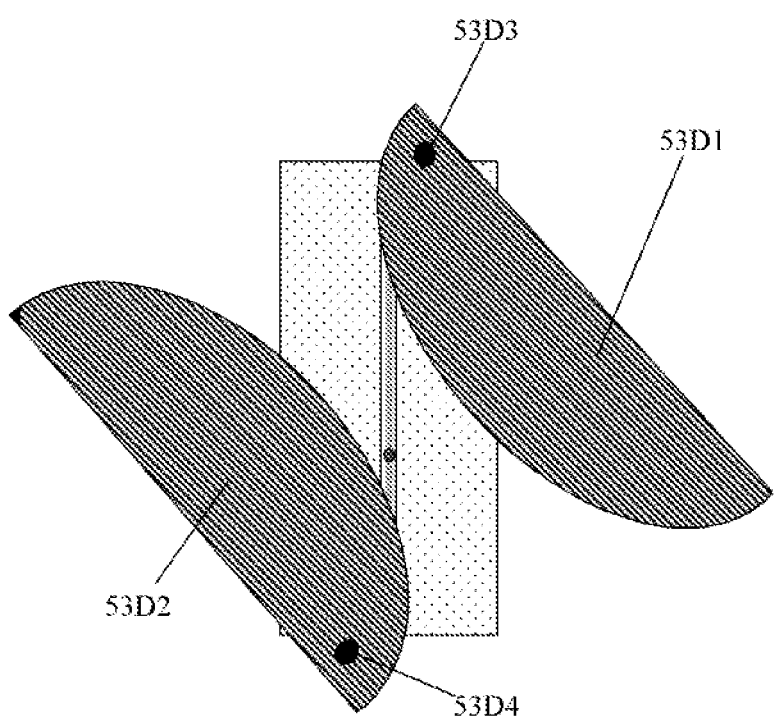
FIG. 5C is a schematic front view of the collimator according to the fourth embodiment of the present disclosure, in which the collimator is in a rotated position in which it shields a part of the ray beam.
Figure 5D:
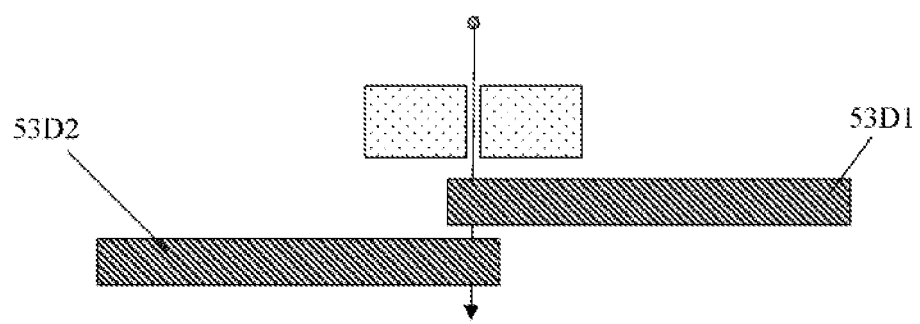
FIG. 5D is a schematic top view of the collimator according to the fourth embodiment of the present disclosure, in which the collimator is in a rotated position in which it shields a part of the ray beam.

Also, as shown in FIG. 5B, the first shielding part 53D1 and the second shielding part 53D2 are spaced from the collimating slit 52 by different distances in a ray propagating direction. In this way, as shown in FIGS. 5C-5D, the first shielding part 53D1 and the second shielding part 53D2 cannot interfere with each other when they rotate about their respective pivots relative to the collimator body 51, thereby allowing to shield at least a part of the collimating slit 52.

Fifth Embodiment

Figure 6A:
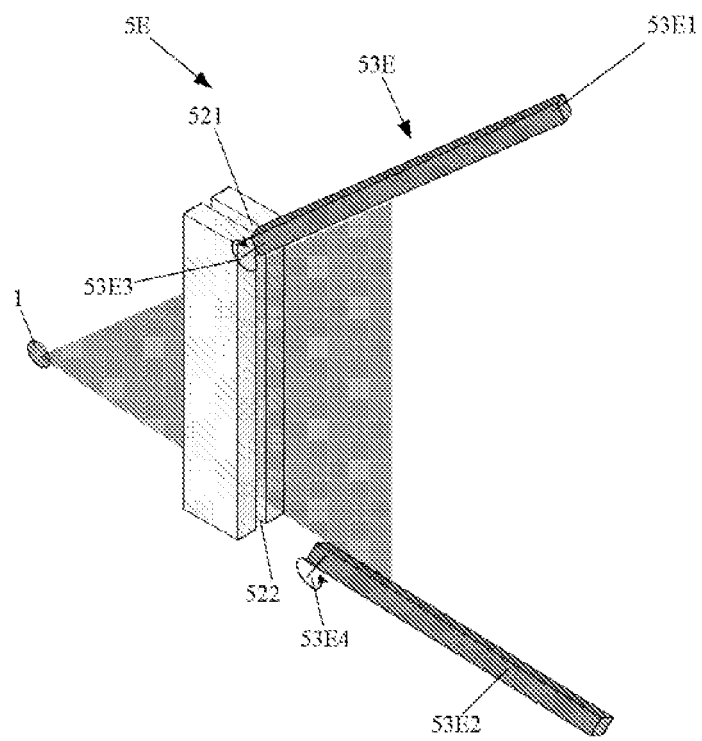
FIG. 6A is a schematic view of a collimator according to a fifth embodiment of the present disclosure, in which the collimator is in an initial position in which it does not shield a ray beam.
Figure 6B:
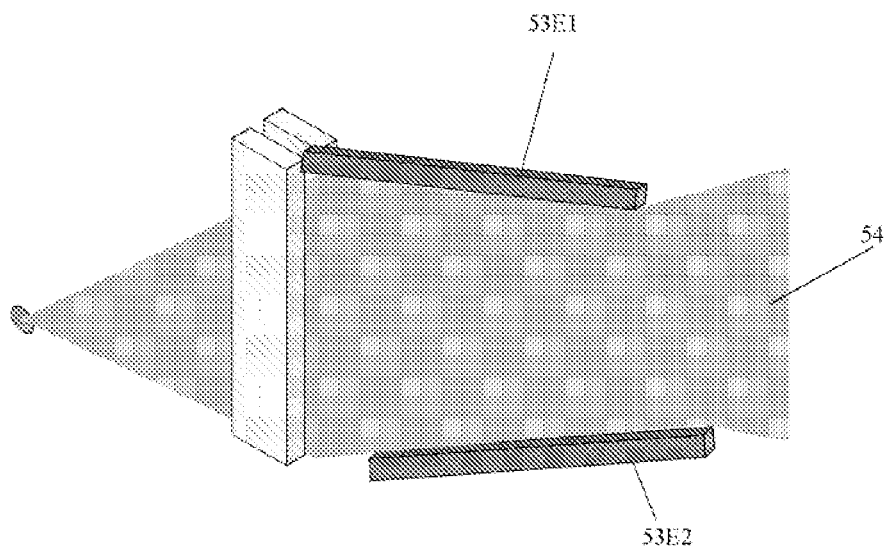
FIG. 6B is a schematic view of the collimator according to the fifth embodiment of the present disclosure, in which the collimator is in a rotated position in which it shields a part of the ray beam.

FIGS. 6A-6B are schematic views of a collimator SE according to a fifth embodiment of the present disclosure. In this embodiment, the same or similar members as that in the first, second, third and fourth embodiments are labeled as the same or similar reference numerals. The fifth embodiment differs from the above embodiments mainly in a structure and a movement manner of the shielding member.

The collimator SE comprises a shielding member 53E. Specifically, as shown in FIG. 6A, the shielding member 53E comprises a first shielding part 53E1 disposed adjacent to the first end 521 of the collimating slit 52 and a second shielding part 53E2 disposed adjacent to the second end 522 of the collimating slit 52. Further, the shielding member 53E comprises a first pivot 53E3 disposed adjacent to the first end 521 of the collimating slit 52 and a second pivot 53E4 disposed adjacent to the second end 522 of the collimating slit 52. Axes of the first pivot 53E3 and the second pivot 53E4 both extend in a direction perpendicular to the beam profile.

In this way, the first shielding part 53E1 is pivotable about the first pivot 53E3 in the Y-plane relative to the collimator body 51 and the second shielding part 53E2 is pivotable about the second pivot 53E4 in the Y-plane relative to the collimator body 51. Thus, as shown in FIG. 6B, the first shielding part 53E1 and the second shielding part 53E2 can adjust steplessly the beam divergent angle and the elevation angle of the ray beam 54 propagating through the collimating slit 52 as they rotate about their respective pivots relative to the collimator body 51.

Sixth Embodiment

Figure 7A:
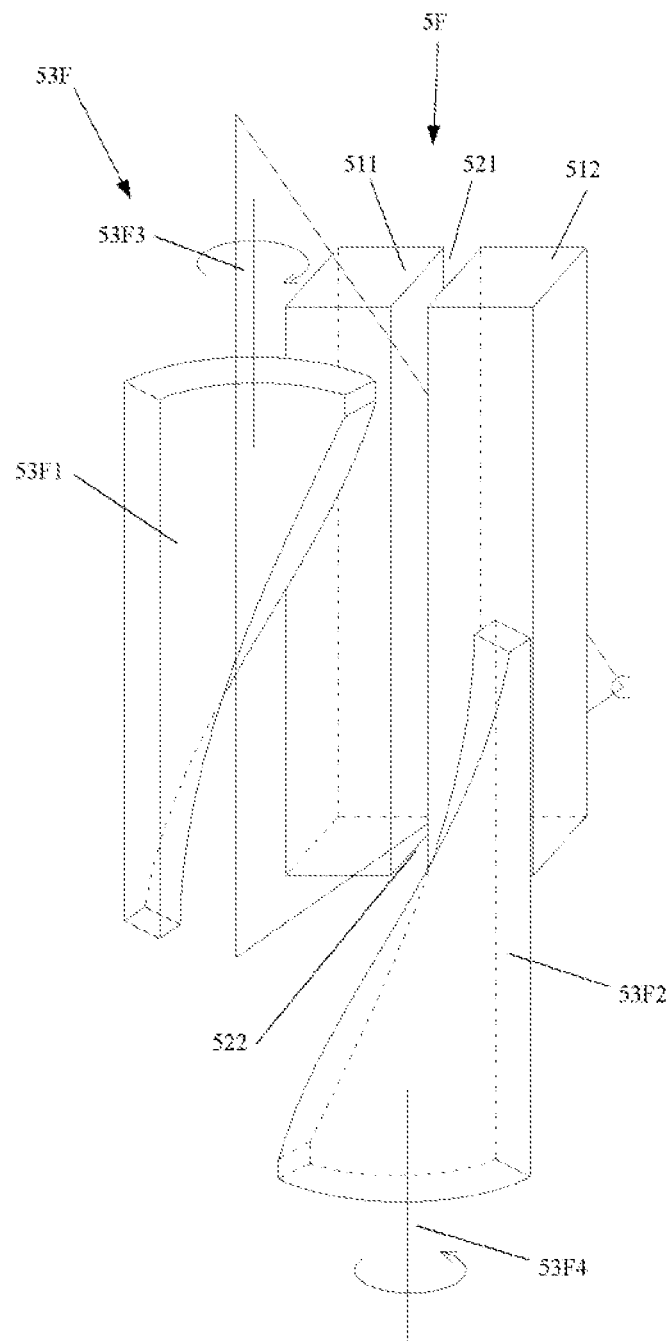
FIG. 7A is a schematic view of a collimator according to a sixth embodiment of the present disclosure, in which the collimator is in an initial position in which it does not shield a ray beam.
Figure 7B:
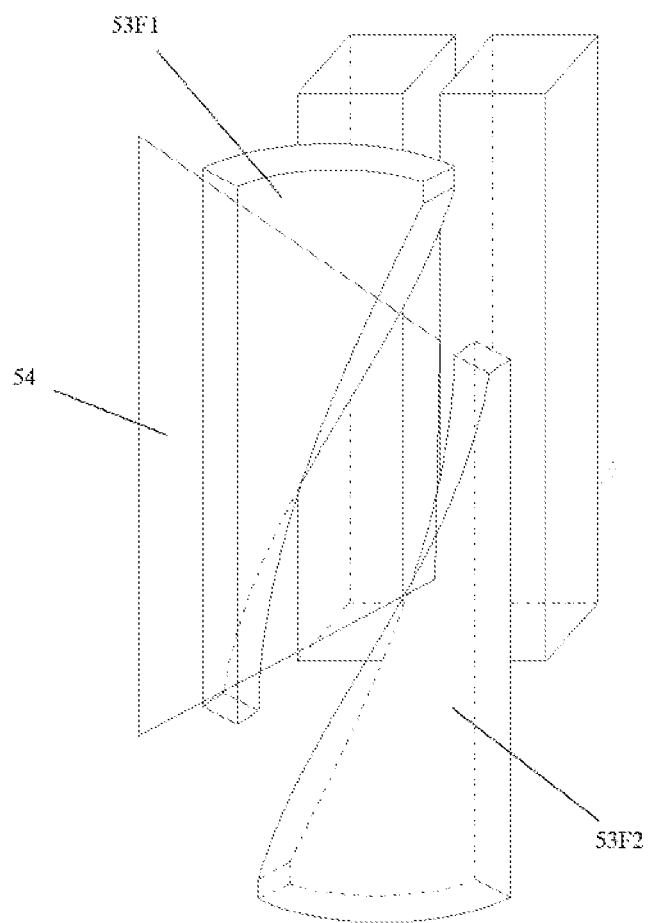
FIG. 7B is a schematic view of the collimator according to the sixth embodiment of the present disclosure, in which the collimator is in a rotated position in which it shields a part of the ray beam.

FIGS. 7A-7B are schematic views of a collimator 5F according to a sixth embodiment of the present disclosure. In this embodiment, the same or similar members as that in the first, second, third, fourth and fifth embodiments are labeled as the same or similar reference numerals. The sixth embodiment differs from the above embodiments mainly in a structure and a movement manner of the shielding member.

The collimator 5F comprises a shielding member 53F. Specifically, as shown in FIG. 7A, the shielding member 53F comprises a first shielding part 53F1 disposed at a side of the first part 511 of the collimator body 51 and a second shielding part 53F2 disposed at a side of the second part 512 of the collimator body 51. As shown, the first shielding part 53F1 and the second shielding part 53F2 each may be in a shape of annular cylinder with a special shape, for example, the first shielding part 53F1 and the second shielding part 53F2 each may include a cylindrical portion formed by cutting a portion having at least one corner portion from a small half of an annular cylinder, particularly, the first shielding part 53F1 and the second shielding part 53F2 each may include a cylindrical portion formed by cutting a portion having at least one corner portion from a quarter of an annular cylinder.

Further, the shielding member 53F comprises a first pivot 53F3 disposed adjacent to the first end 521 of the collimating slit 52 and a second pivot 53F4 disposed adjacent to the second end 522 of the collimating slit 52. Axes 53F5, 53F6 of the first pivot 53F3 and the second pivot 53F4 both extend in a direction parallel to the longitudinal direction of the collimating slit 52 in the beam profile Y.

In this way, as shown in FIG. 7B, as the first shielding part 53F1 and the second shielding part 53F2 rotate about their respective pivots relative to the collimator body 51, the first shielding part 53F1 and the second shielding part 53F2 can gradually shield at least a part of the collimating slit 52, thereby allowing to adjust steplessly the beam divergent angle and the elevation angle of the ray beam 54 propagating through the collimating slit 52.

In the above embodiments, the shielding member 53 is disposed at a side of the collimator body 51 opposite to the ray source 1, that is, at a side close to an object to be inspected. Alternatively, the shielding member 53 may be disposed at a side of the collimator body 51 close to the ray source 1.

In the above embodiments, the shielding member 53 may be moved or rotated by hand, or be moved or rotated by a driving mechanism, for example, including a motor and a screw mechanism, or a magnetostrictive mechanism or the like.

In the above embodiments, the shielding member 53 may be moved or rotated relative to the collimator body 51 independently from each other, alternatively, may be moved or rotated relative to the collimator body 51 in synchronization with each other.

In the above embodiments, the shielding member 53 may be formed of any suitable materials having a ray shielding function, for example, plumbum. Alternatively, one shielding member 53 may have multiple parts formed of materials having different attenuation characteristics.

Figure 8:
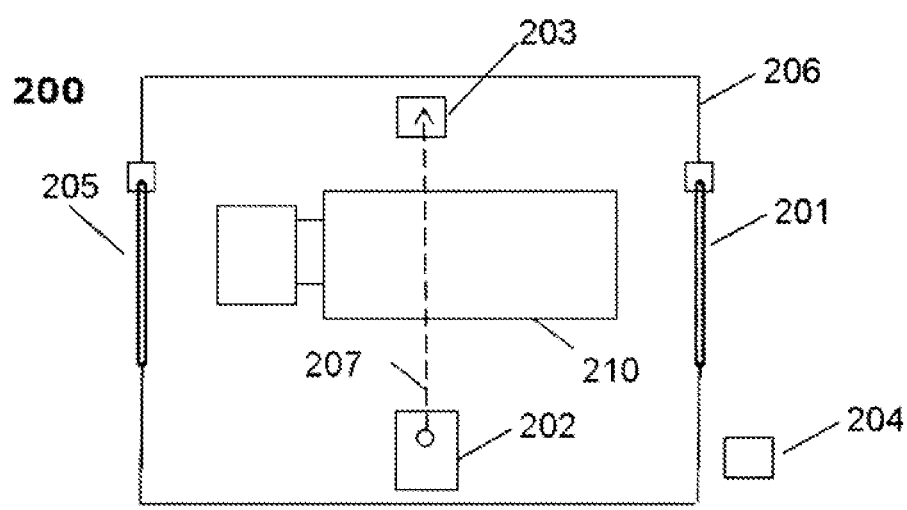
FIG. 8 is a schematic view of an inspection system for scanning a vehicle according to an embodiment of the present disclosure.

According to another aspect of the present disclosure, the above inspection system can be used to scan a vehicle, that is, to form an inspection system for scanning a vehicle. The inspection system is schematically shown in FIG. 8.

The inspection system 200 for scanning a vehicle comprises: an entrance barrier 201 of a scanning passage configured for allowing a vehicle to be inspected to enter the inspection system; a ray source 202 for emitting ray, such as an accelerator; a collimator (not shown in FIG. 8) as stated above configured for collimating the ray emitted from the ray source; a detector 203 for receiving the ray; a driving device (not shown) configured for supporting and/or driving the vehicle to be inspected and disposed within an inspected area formed by the collimator and the detector; an operation platform 204 for the driving device; an exit barrier 205 of the scanning passage configured for allowing the inspected vehicle to exit the inspection system; a fence 206 configured for indicating a boundary of a radiation supervised area of the inspection system; and a controller (not shown) configured to be electrically connected to the entrance barrier 201 of the scanning passage, the collimator, the operation platform 204 for the driving device and the exit barrier 205 of the scanning passage. In FIG. 8, the vehicle to be inspected is indicated by 210.

Optionally, the inspection system 200 may further comprise at least one first sensor (not shown) positioned upstream of the inspection system, which is configured for detecting a type of the vehicle 210 to be inspected. For example, the vehicle to be inspected may include various types, such as container truck, van truck, small passenger vehicle and the like. Moreover, the controller is electrically connected to the at least one first sensor. Optionally, the inspection system 200 may further comprise at least one second sensor (not shown) positioned upstream of the inspection system, which is configured for detecting a loaded amount in the vehicle 210 to be inspected. Moreover, the controller is electrically connected to the at least one second sensor.

According to another further aspect of the present disclosure an inspection method of the above inspection system 200 may comprise steps of:

selecting a scanning mode;

emitting ray by the ray source;

enabling the ray to propagate through the collimating slit of the collimator so as to form a ray beam;

measuring a boundary dose rate of a radiation supervised area; and controlling the shielding member of the collimator to move relative to the collimator body based on the selected scanning mode and the measured boundary dose rate.

In an embodiment, the scanning mode comprises a standard scanning mode and a secondary scanning mode. In the standard scanning mode, the ray propagating through the collimating slit scans the whole vehicle. In the secondary scanning mode, the ray propagating through the collimating slit performs a secondary scan on a suspected area determined through the standard scanning.

In an embodiment, the step of controlling the shielding member of the collimator to move relative to the collimator body based on the selected scanning mode and the measured boundary dose rate may comprise: controlling the shielding member of the collimator to move relative to the collimator body so as to shield at least a part of the ray beam propagating through the collimating slit in the standard scanning mode. As a result, in the standard scanning mode, the shielding member is moved or rotated to shield at least a part of the ray beam propagating through the collimating slit, which allows to reduce the boundary dose rate while keeping an area of the radiation supervised area constant, alternatively, which allows to reduce an area of the radiation supervised area while keeping the boundary dose rate constant.

In an embodiment, the step of controlling the shielding member of the collimator to move relative to the collimator body based on the selected scanning mode and the measured boundary dose rate may comprise: controlling the shielding member of the collimator to move relative to the collimator body while increasing the dose rate and/or an energy of the ray source in the secondary scanning mode, so as to improve an image quality while keeping an area of the radiation supervised area and the boundary dose rate constant.

By using the inspection system and the inspection method according to the present disclosure, a collimator can be adjusted as required to vary an inclined angle and an elevation angle of a ray beam, thereby allowing to increase a dose rate of the ray to improve a partial image quality. For example, in the inspection system for scanning a vehicle, ray doses in a region where wheels are located and in empty compartments or air compartments in and above a top of a vehicle container may be restricted to reduce a transmitted dose of the entire system and thus reduce a scattered dose indirectly, thereby achieving an objective of reducing a boundary dose rate; alternatively, to improve an image quality of a suspected area while the radiation supervised area is not enlarged and an original safety standard is kept.

The collimator, the inspection system and the inspection method according to the embodiments of the present disclosure may be applied in the following various cases and achieve the following effects.

(1) in the standard scanning mode, the shielding member is moved or rotated to shield at least a part of the ray beam propagating through the collimating slit, which allows to reduce the boundary dose rate while keeping an area of the radiation supervised area constant, alternatively, which allows to reduce an area of the radiation supervised area while keeping the boundary dose rate constant.

(2) in the secondary scanning mode, controlling the shielding member of the collimator to move relative to the collimator body while increasing the dose rate and/or an energy of the ray source so as to improve an image quality while keeping an area of the radiation supervised area and the boundary dose rate constant.

In the above embodiments, various movement manners including longitudinal displacement, lateral displacement, rotation about different axes and the like are included. The first shielding part and the second shielding part can employ the same movement manner. However, it should be appreciated by those skilled in the art that the first shielding part and the second shielding part can also employ different movement manners, for example, the first shielding part may employ the longitudinal displacement manner while the second shielding part may employ the rotary manner. In other words, the various movement manners in the above embodiments may be freely combined without conflict, and these combinations should also be included in the scope of the present invention.

The objectives, solutions and effects have been explained in detail by means of the above specific embodiments. It should be understood that the above description is merely some specific embodiments of the present invention, rather than limiting the present invention. Any modifications, equivalents and changes within the spirit and principle of the present invention shall tall into the scope of the present invention.

What is claimed is:

1. A collimator comprising:
   a collimator body comprising a first part, a second part, and a collimating slit formed between the first part and the second part, the collimating slit having a first end and a second end in a longitudinal direction thereof; and
   a shielding member which is movable relative to the collimator body in a direction perpendicular to a beam profile such that a beam divergent angle of a ray beam propagating through the collimating slit is varied or both a beam divergent angle and an elevation angle of a ray beam propagating through the collimating slit are varied.

2. The collimator according to claim 1, wherein the shielding member is movable relative to the collimator body to completely shield the ray beam propagating through the collimating slit.

3. The collimator according to claim 1, wherein the shielding member is configured to shield at least a part of the collimating slit as it moves relative to the collimator body, so as to allow the ray propagating through a remaining part of the collimating slit to form a continuous ray beam, the beam divergent angle of the continuous ray beam or both the beam divergent angle and the elevation angle of the continuous ray beam being varied as the shielding member moves relative to the collimator body.

4. The collimator according to claim 1, wherein the shielding member is capable of adjusting steplessly the beam divergent angle of the ray beam propagating through the collimating slit or both the beam divergent angle and the elevation angle of the ray beam propagating through the collimating slit as the shielding member moves relative to the collimator body.

5. The collimator according to claim 1, wherein the shielding member comprises a first shielding part which is disposed at a side of the first part of the collimator body and is movable in a direction perpendicular to the longitudinal direction of the collimating slit in a plane passing through the collimating slit and perpendicular to a beam profile relative to the collimator body; and/or a second shielding part which is disposed at a side of the second part of the collimator body and is movable in a direction perpendicular to the longitudinal direction of the collimating slit in a plane passing through the collimating slit and perpendicular to the beam profile relative to the collimator body.

6. The collimator according to claim 5, wherein the first shielding part and/or the second shielding part each has a cross section of multi-stepped shape or triangular shape.

7. The collimator according to claim 1, wherein the shielding member comprises a first shielding part and a second shielding part, the first shielding part and the second shielding part are spaced from the collimating slit by different distances in a ray propagating direction.

8. The collimator according to claim 1, wherein the first shielding part and the second shielding part are allowed to move relative to the collimator body independently from each other.

9. The collimator according to claim 1, wherein the first shielding part and the second shielding part are allowed to move relative to the collimator body in synchronization with each other.

10. An inspection system comprising:
a ray source for emitting ray;
the collimator according to claim 1 configured for collimating the ray emitted from the ray source;
a detector for receiving the ray.

11. A collimator comprising:
a collimator body comprising a first part, a second part, and a collimating slit formed between the first part and the second part, the collimating slit having a first end and a second end in a longitudinal direction thereof;
a shielding member which is movable relative to the collimator body such that a beam divergent angle of a ray beam propagating through the collimating slit is varied or both a beam divergent angle and an elevation angle of a ray beam propagating through the collimating slit are varied;
wherein the shielding member comprises a first shielding part and a first pivot which both are disposed adjacent to the first end of the collimating slit, the first pivot extending in a direction perpendicular to the longitudinal direction of the collimating slit in a plane parallel to a beam profile, the first shielding part being pivotable about the first pivot relative to the collimator body; and/or a second shielding part and a second pivot which both are disposed adjacent to the second end of the collimating slit, the second pivot extending in the direction perpendicular to the longitudinal direction of the collimating slit in the plane parallel to the beam profile, the second shielding part being pivotable about the second pivot relative to the collimator body;
wherein the first shielding part and/or the second shielding part each has a planar plate-like structure having a semi-circular cross section, a semi-circular edge of the planar plate-like structure being configured to change a length of the collimating slit.

12. A collimator comprising:
a collimator body comprising a first part, a second part, and a collimating slit formed between the first part and the second part, the collimating slit having a first end and a second end in a longitudinal direction thereof;
a shielding member which is movable relative to the collimator body such that a beam divergent angle of a ray beam propagating through the collimating slit is varied or both a beam divergent angle and an elevation angle of a ray beam propagating through the collimating slit are varied;
wherein the shielding member comprises a first shielding part which is disposed at a side of the first part of the collimator body and a first pivot which is disposed adjacent to the first end of the collimating slit, an axis of the first pivot extending in a direction parallel to the longitudinal direction of the collimating slit in a plane parallel to a beam profile, the first shielding part being pivotable about the first pivot relative to the collimator body to shield at least a part of the collimating slit; and/or a second shielding part which is disposed at a side of the second part of the collimator body and a second pivot which is disposed adjacent to the second end of the collimating slit, an axis of the second pivot extending in the direction parallel to the longitudinal direction of the collimating slit in the plane parallel to the beam profile, the second shielding part being pivotable about the second pivot relative to the collimator body to shield at least a part of the collimating slit.

13. The collimator according to claim 12, wherein the first shielding part and/or the second shielding part each is formed of a part of an annular cylinder.

14. An inspection method for scanning a vehicle, comprising steps of:
selecting a scanning mode;
emitting ray by a ray source;
enabling the ray to propagate through a collimating slit of a collimator so as to form a ray beam;
measuring a boundary dose rate of a radiation supervised area; and
controlling a shielding member of the collimator to move relative to a collimator body in a direction perpendicular to a beam profile based on the selected scanning mode and the measured boundary dose rate.

15. The inspection method according to claim 14, wherein the scanning mode comprises a standard scanning mode in which the ray propagating through the collimating slit scans the whole vehicle and a secondary scanning mode in which the ray propagating through the collimating slit performs a secondary scan on a suspected area determined through the standard scanning.

16. The inspection method according to claim 15, wherein the step of controlling a shielding member of the collimator to move relative to a collimator body based on the selected scanning mode and the measured boundary dose rate comprises:
controlling the shielding member of the collimator to move relative to the collimator body so as to shield at least a part of the ray beam propagating through the collimating slit in the standard scanning mode.

17. The inspection method according to claim 15, wherein the step of controlling a shielding member of the collimator to move relative to a collimator body based on the selected scanning mode and the measured boundary dose rate comprises: controlling the shielding member of the collimator to move relative to the collimator body while increasing the dose rate and/or an energy of the ray source in the secondary scanning mode, so as to improve an image quality while keeping an area of the radiation supervised area and the boundary dose rate constant.

* * * * *